Aug. 30, 1960 — R. J. BROADWELL — 2,950,738
DAMPED AIR VALVE
Filed July 12, 1957 — 2 Sheets-Sheet 2
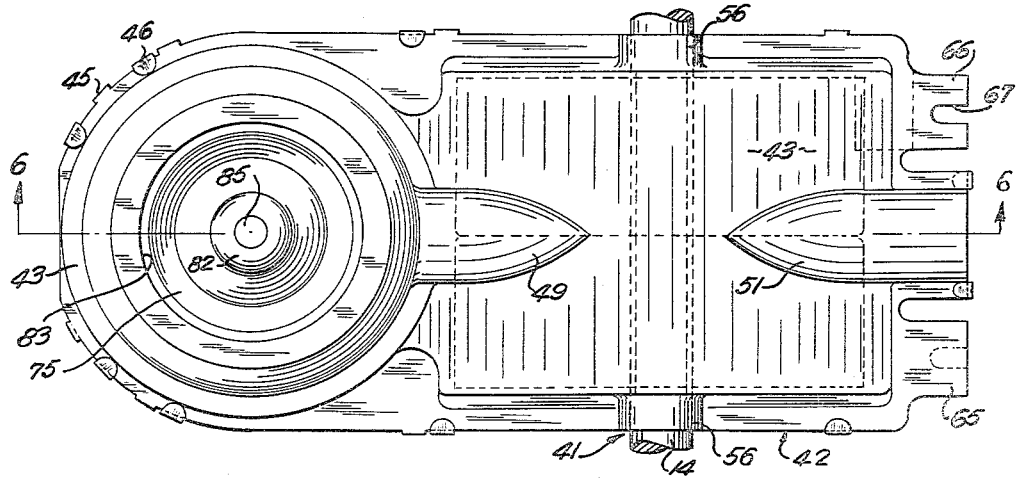
FIG. 5
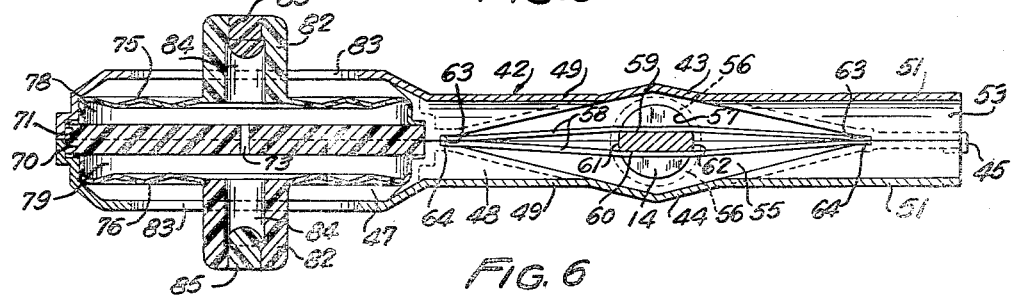
FIG. 6
FIG. 7
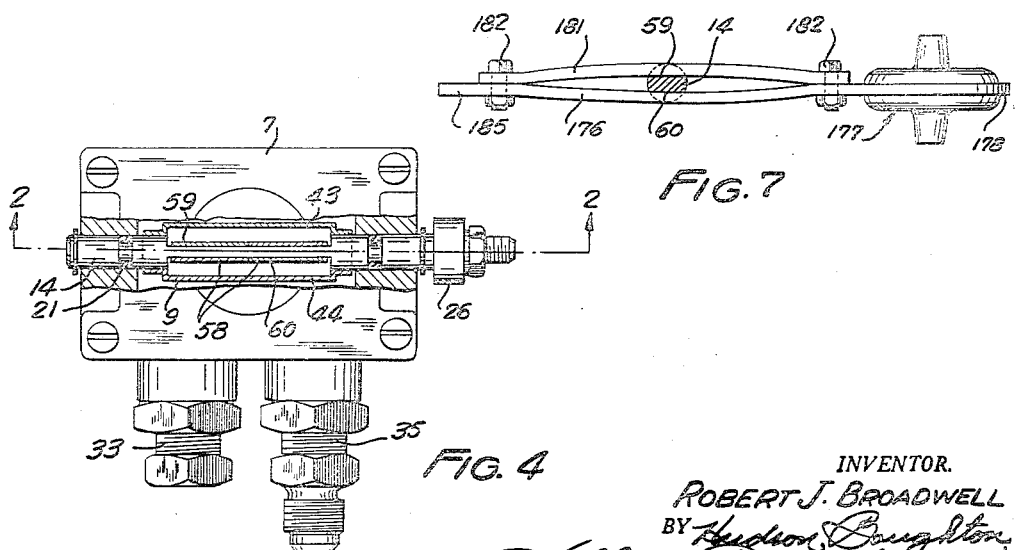
FIG. 4
INVENTOR.
ROBERT J. BROADWELL
BY Hudson, Creighton,
Williams, David & Hoffmann
ATTORNEYS United States Patent Office 2,950,738
Patented Aug. 30, 1960

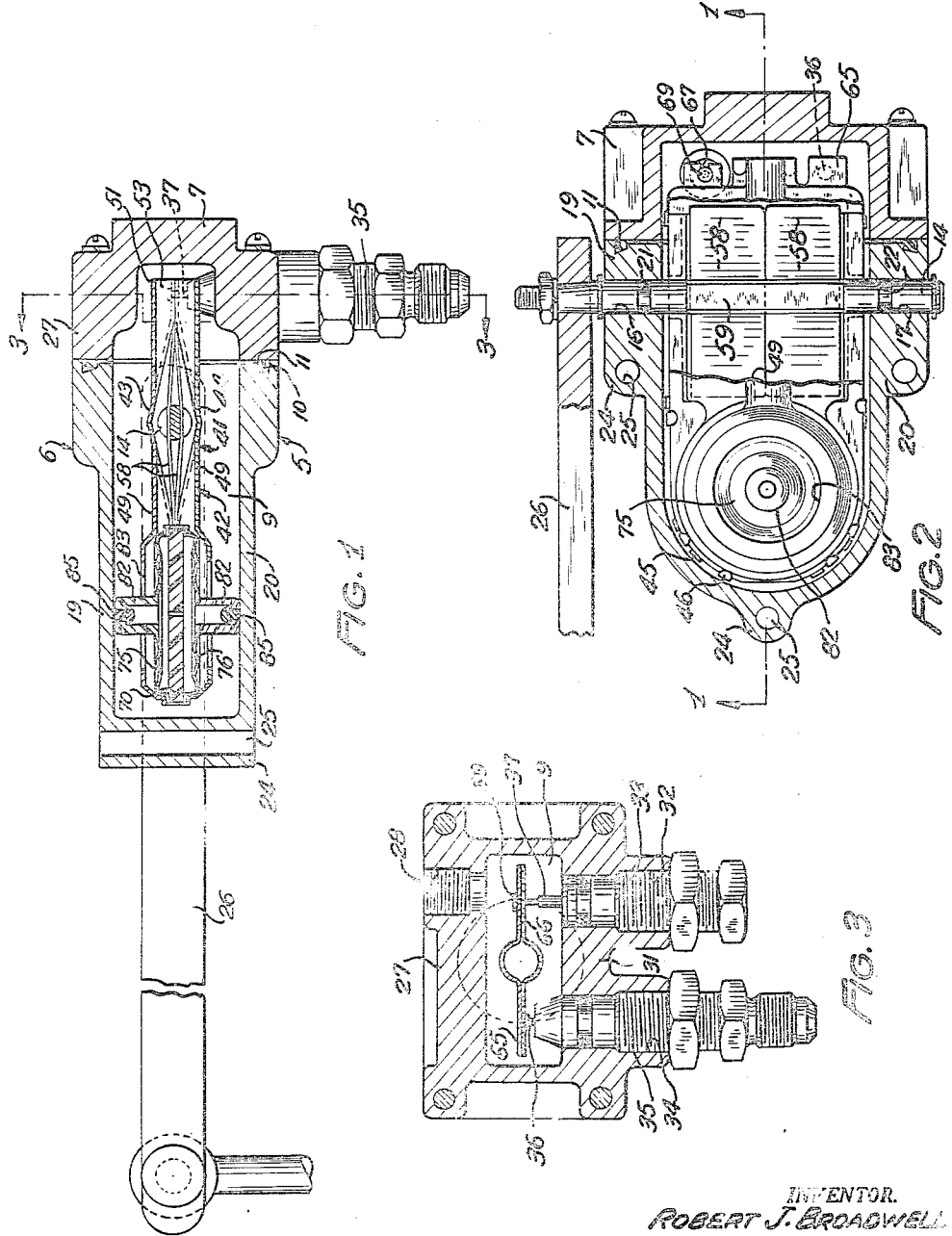

2,950,738

DAMPED AIR VALVE

Robert J. Broadwell, Cleveland, Ohio, assignor to The Gabriel Company, Cleveland, Ohio, a corporation of Ohio Filed July 12, 1957, Ser. No. 671,495

2 Claims. (Cl. 137—627.5)

This invention relates to a novel damped valve device for controlling the movement of one or more members relative to another member, wherein one and/or all of said members may be movable, and is particularly applicable for use with one or more fluid pressure devices which effect the relative movement of two movable members, wherein the relative movement between said members actuates the damped valve device to positively control the functioning of said fluid pressure device and/or devices.

Primary utility for the instant damped valve device is realized upon its utilization in a pneumatic suspension system for automotive vehicles or the like whereby the body of the vehicle defining one movable member or mass is resiliently supported above the axles thereof by an air spring, said axles defining a second movable member or mass, and wherein said damped valve device is operatively connected between said vehicle members and further, is actuated by a relative movement therebetween to cause an adjustment to said air spring and maintain said vehicle members in a predetermined "safe riding" spaced relationship.

In the following detailed disclosure of several forms of the present invention the damped valve device is shown and described for use in conjunction with the above type of vehicle pneumatic suspension system; however, it is to be understood that the instant device may be applicable to other systems wherein control of the relative movement between a plurality of members may be desired.

Therefore, a primary object of the present invention is the provision of an improved damped valve device for use with a fluid pressure device for controlling the relative movement of two movable members.

Another object is the provision of an improved damped valve device as characterized in the preceding object and wherein said device includes a shaft operatively connected to one movable member and which carries a pendant assembly normally positioned in an inactive position and which is movable by the oscillation of the shaft to selectively control the functioning of said fluid pressure device and thereby control the relative movement of said members in proportion to the movement of said one member connected to the shaft.

Still another object of the present invention is the provision of an improved damped valve device as characterized in the last two preceding objects and wherein the pendant assembly is resiliently coupled to the shaft and movable thereby and operable at a point remote from said coupling to selectively control the functioning of said fluid pressure device and thereby control the relative movement of said members, and wherein the damped valve device is additionally provided with damping and delay means operative to delay the movement of the pendant assembly.

Another object of the present invention is the provision of an improved damped valve device for use in connection with a resilient air spring in a pneumatic vehicle suspension system for supporting the body of the vehicle above its riding axles in a predetermined spaced relationship, and wherein the damped valve device includes a shaft connected to either one of the vehicle members being oscillated thereby in response to a relative movement between said vehicle members to actuate valve means and change the resiliency of said air spring in proportion to the movement of either and/or both of said vehicle members.

The invention may be briefly summarized as consisting in certain constructions and combinations and arrangements of parts, and further objects and advantages will be apparent from the following description of several preferred forms of the invention, reference being made to the accompanying drawings which form a part of this specification and wherein, Fig. 1 is a sectional view taken substantially on line 1—1 of Fig. 2 and shows one form of damped valve device embodying the present invention with the pendant assembly of the valve device resiliently coupled to the actuating shaft and disposed in its nonoperative position in the housing;

Fig. 2 is a longitudinal sectional view taken substantially on line 2—2 of Fig. 4 but shows the pendant assembly partially broken away to show its resilient coupled relationship with the actuating shaft and the means for operating the plungers or valve pins for the control valves at a point remote from the resilient coupling;

Fig. 3 is a transverse sectional view taken substantially on line 3—3 of Fig. 1 and shows the valves for controlling the fluid pressure device mounted in the housing cap of the damped valve device and with their actuating plungers operatively associated with the pendant assembly;

Fig. 4 is a plan view of the damped valve device of Fig. 1 but with the housing cap partially broken away and the underlying parts of the pendant assembly removed to show the configuration of the actuating shaft and the resilient torque coupling between the latter and the pendant assembly;

Fig. 5 is an enlarged plan view of the pendant assembly of the damped valve device of Fig. 1;

Fig. 6 is a sectional view taken substantially on line 6—6 of Fig. 5 and shows the assemblage of elements for the pendant assembly as disposed within their housing and with the actuating shaft coupled thereto; and Fig. 7 is a modified form of pendant assembly shown in a torque coupled relation with the actuating shaft of the damped valve device of the present invention.

In the following detailed description of several forms of the present invention the pneumatic suspension system (not shown) shall be considered as of the type referred to above utilizing "air springs" of known construction, and which supports a vehicle body above its axles, being adjustable by the damped valve device of the present invention to maintain said body above the axles in a predetermined spaced relationship.

Assuming that the vehicle body is supported above the axles in their normal "safe-riding" spaced relationship, then loading of the body would compress the air springs whereby the said body is lowered toward the axles. To correct for this the relative movement between said vehicle members is utilized to actuate the instant damped valve device and introduce a pressurized fluid, preferably air, to said air springs to return the vehicle body to its normal riding position. In like manner, if the mass of the body is lessened, the air springs would tend to cause said body to rise farther above the axles and this is corrected for by actuation of the damped valve device through the relative movement of said vehicle members in the opposite direction, whereby the air springs are connected to atmosphere and deflated in accordance with the diminishing load to maintain the vehicle body at its normal riding height relative to the axles.

Additionally, assuming that the vehicle is traveling over an irregular roadway whereby the vehicle members are rapidly forced slightly toward or away from each other, the damping and delay mechanism included in the present invention is operative to prevent rapid inflation and/or deflation of the air springs which would eventually cause said air springs to be completely inoperative, due to loss of reserve air.

In the detailed description now to follow merely for purposes of simplification, the damped valve device of the present invention shall be utilized to control one air spring; however, it is understood that any desired number of said air springs may be used without departing from the inventive concepts contained herein.

Referring now to the drawings, the damped valve device in the form shown in Figs. 1–6 inclusive, includes a housing 5 consisting of a hollow body 6 and a cap 7 placed in a complemental abutting relationship to define a fluid pressure chamber 9. An annular groove 10, provided on the end of the body 6 adjoining the cap 7 seats a gasket 11 and provides an effective seal therebetween. An elongated actuating shaft 14 is journalled in aligned bores 16 and 17 formed in the side walls 19 and 20, respectively, of the body 6 and extends completely across the chamber 9. A suitable O-ring 21 mounted in an annular groove 22 provided on each end of the shaft 14 is disposed in each of the bores 16 and 17 and prevents the transgression of pressure fluid therethrough. The body 6 of the housing 5 is additionally formed with bosses 24 having apertures 25 which provide for the attachment of said body to either vehicle member, the frame or the riding axles, while the shaft 14 mounts one end of a rock lever 26, the opposite end of which is suitably attached to the remaining vehicle member.

As previously mentioned, the damped valve device, in its present form, is interposed into the vehicle suspension and is effective to control the inflation and/or deflation of the air spring, in response to a relative movement of predetermined duration between the vehicle members. To accomplish this, the side wall 27 of the housing cap 7, Fig. 3, is provided with a threaded port 28 communicating with the chamber 9 and receives a suitable sleeve fitting (not shown). One end of a conduit, not shown, is connected to the fitting in the threaded port 28, while the opposite end of said conduit is connected in fluid circuit with the air spring of the fluid suspension system. In like manner, the oppositely disposed side wall 31 of the housing cap 7 is provided with a threaded port 32, also communicating with the chamber 9 and which receives a sleeve fitting 33. Similarly, a threaded port 34 is provided in said latter side wall of the housing cap, being spaced from the port 32, and receives a suitable sleeve fitting 35. To the end of the fitting 35 is connected one end of a conduit, not shown, the opposite end of which is attached to a source of pressure fluid, preferably pressurized air. Each of the sleeve fittings 33 and 35 is provided centrally with a bore adapted to receive a valve core or insides, such as is employed in the valve stems of pneumatic tires, and which is similar to the valve core or insides as is described and disclosed in my copending application, Serial No. 632,155, filed on January 2, 1957, and therefore, a further detailed description thereof will not be given. However, the bore in the sleeve fitting 35 is formed such that the valve core is screwed into the inner end of the fitting and its spring biased valve pin or plunger 36 extends into the pressure chamber 9 and is adapted to be pressed in a downward direction, as viewed in Fig. 3, by means later to be described, to open said valve and connect the chamber 9 and hence the air spring, through sleeve fitting 35 to the source of pressure fluid to inflate the latter. And, the bore in the sleeve fitting 33 is reversed to that of the bore in fitting 35, such that the valve core or insides disposed therein has its spring biased valve pin or plunger 37 extending into the pressure chamber 9 and adapted to be pulled in an upward direction, as viewed in Fig. 4, by the actuating means, to open the valve and connect the pressure chamber and the air spring to atmosphere to deflate the latter.

To provide for the actuation of the valves in the sleeve fittings 33 and 35 in the manner just described, to control the adjustment of the air spring, a pendant assembly 41 is disposed in the pressure chamber 9 and is resiliently coupled to the actuating shaft 14. The pendant assembly 41 includes a housing 42 which consists of a pair of elongated, substantially identical stamped members 43 and 44 placed one against the other in a complemental opposed relation and retained in said position by spaced tabs 45 and 46 formed integrally on the periphery of each of the members and bent to extend over the opposing member. Said members are so formed as to provide a substantially enlarged cup-shaped chamber or enclosure 47 in one end of the housing 42 and a separate substantially elongated cavity 48 adjacent said latter chamber. An upstanding rib or radius 49 formed on each of the housing members 43 and 44 is effective to provide additional rigidity to the housing 42. In like manner, the opposite end of each of the housing members 43 and 44 is also similarly formed centrally with an upstanding rib or radius 51, which also unite in a complemental opposed relationship to form a tubular channel 53, the purpose for which will be later explained. The opposed, depending walls 54 and 55 on each side of the housing members 43 and 44 respectively are each provided with a semi-circular flange 56 being in substantial alignment to form an aperture 57 which receives and provides for the extension of the actuating shaft 14 centrally through the cavity 48.

The pendant assembly 41 is resiliently coupled to the actuating shaft 14 by spring means, which in the instant form comprises four substantially identical leaf springs 58, Figs. 2 and 6, disposed in pairs in the cavity 48 such that one pair at its center embraces a flat 59 formed on the actuating shaft, while the remaining pair similarly embraces a flat 60 formed on the diametrically opposed side of said shaft. The shaft 14 is thereby provided with diametrically opposed curved surfaces 61 and 62 defined by said flats. The leaf springs comprising each pair lie in side-by-side relation so as to extend substantially completely across their respective flat. Additionally, the housing members 43 and 44 are formed so as to provide a substantially rectangular recess 63 at each end of the housing cavity 48 into which is seated the extreme ends 64 of the leaf springs 58.

The end of the housing 42 opposite to the cup-shaped chamber 47, is provided with a pair of spaced tabs or fingers 65 and 66 which extend outwardly from said latter end and are positioned to operate either of the valves in sleeve fittings 33 and 35, depending upon the direction of relative movement between the vehicle members. The finger 65 is positioned to extend over the actuating pin 36 of the valve in sleeve fitting 35, while the finger 66 is provided with a slot 67 through which the actuating pin 37 of the valve in sleeve fitting 33 extends and a head 69, formed on the end of said actuating pin is substantially larger in diameter than the diameter of the slot 67 so that an upward movement of the finger 66, as viewed in Fig. 3, causes the latter to engage the underside of said head and effect an upward movement of the actuating pin 37.

With the above construction, and assuming that the housing of the instant device is mounted on the frame of the vehicle and the shaft 14 is connected through the lever arm 26 to the riding axles, then a relative movement between the vehicle members caused, for instance, by increasing the load carried by the body whereby the latter is lowered toward the axles, is effective to rotate the actuating shaft 14 clockwise, as viewed in Fig. 1. This rotation is transmitted through the resilient coupling to the pendant assembly and effects the clockwise swinging movement of the latter, whereby the finger 65 is carried downward to depress the actuating pin 36 and open the valve in sleeve fitting 35. The pressurized air in fluid circuit with said sleeve fitting then flows into the pressure chamber 9 and thence through the port 28 to the air spring connected in circuit therewith. The air spring is thereby inflated in proportion to the relative movement between the vehicle members, and as said air spring is inflated, this causes a relative movement between the vehicle members in the opposite direction which is effective to rotate the shaft 14 counterclockwise. This latter movement of the shaft also swings the pendant assembly counterclockwise, as viewed in Fig. 1, whereby the finger 65 is carried upwardly therewith. And, when the vehicle members are returned to their normal "safe riding" spaced relationship, the upward movement of the finger 65 is sufficient to permit the spring biased valve actuating pin 36 to close the valve in the sleeve fitting 35, whereby the source of pressurized air is disconnected from the air spring.

Conversely, an initial relative movement between the vehicle members, caused for instance by decreasing the load carried by the body, is effective to rotate the shaft 14 in a counterclockwise direction and swings the pendant assembly counterclockwise and moves the finger 66, attached to its end, in an upward direction. The actuating pin 37 is pulled thereby upwardly into the pressure chamber 9, and is operative to open the valve in the sleeve fitting 33 to connect the pressure chamber and air spring in fluid circuit therewith to atmosphere. The air spring is hence deflated in proportion to the decrease in the load and returns the vehicle members to their normal "safe riding" spaced relationship. And, said latter relative movement between the vehicle members is then, in turn, effective to rotate the shaft in a clockwise direction and return the pendant assembly to a non-operative neutral position within the cavity 9, whereby the valve actuating pin 37 moves downwardly into the sleeve fitting 33 under the influence of its biasing spring to close the valve in the fitting 33 and disconnect the cavity and air spring from atmosphere.

In accordance with the concepts of the present invention, it is intended that a relative movement between the vehicle members must be sustained over a prolonged period of time in order to effect an adjustment to the air spring in the manner just described. To accomplish this, a delay and damping mechanism carried in the pendant assembly is effective to delay and/or dampen the swinging of the latter. In the instant form the delay and damping mechanism includes a flat circular plate 70 of an impervious construction disposed centrally in the chamber 47 with its outermost peripheral edge seated in an annular groove 71 formed by each of the opposed housing members 43 and 44. An orifice 73 is formed through the center of the plate 70 to permit a transgression of fluid medium from one side of said plate to the other in a manner to be presently described. A pair of flexible diaphragm members 75 and 76 is attached at their respective outermost diametrical edges to opposite sides of the plate 70 in fluid leakproof relation so as to form a fluid chamber 78 between the diaphragm member 75 and the top face of the plate 70, as viewed in Figs. 1 and 5, and in like manner, a fluid chamber 79 formed between the oppositely disposed diaphragm member 76 and the underside face of said plate. Each of the above fluid chambers is in fluid circuit with the other through the aforesaid orifice 73. A small opening is formed in the center of each flexible diaphragm member 75 and 76, defining thereby an axial annular surface which is firmly attached in a fluid leakproof relation to the periphery of a tubular-shaped button or pin 82. Each of the buttons 82 extends transversely outwardly of its associated diaphragm member, and an enlarged opening 83 is provided centrally in each of the housing members 43 and 44 through which said buttons protrude. Each of said buttons is additionally provided centrally with a port 84 communicating with the fluid chamber associated therewith. A quantity of a suitable fluid medium is placed into the fluid chambers 78 and 79 through the above mentioned ports 84 to completely fill said chambers and also said ports. A plug 85 is then pressed into the outer end of the latter to effectively seal the same and retain the fluid medium within said chambers.

Hence, with the fluid chambers substantially completely filled, as above described, the diaphragm member 75 is normally positioned upwardly in a spaced relation to the upper face of the flat plate 70 such that the closed end of the button 82 associated therewith, extends upwardly through the opening 83 in the housing member 43 and is in substantial contact with the inner surface of the side wall 19 of the valve body 6. And, in like manner, the diaphragm member 76 is normally positioned below and in a spaced relation to the underside face of the flat plate 70 such that the closed end of the button 82 associated therewith extends downwardly through the opening 83 in the housing member 44 and is in substantial contact with the inner surface of the side wall 20 of the valve body 6. In this manner the delay and damping mechanism is normally positioned centrally within the chamber 9 and is also effective to normally position the valve actuating lugs or fingers 65 and 66 in a non-operative position relative to their valve actuating pins 36 and 37, respectively.

With the above described structure, and assuming that the body 6 of the instant device is mounted on the frame of the vehicle and the actuating shaft 14 is connected through rock lever 26 to the riding axles of the vehicle, then a relative movement between the vehicle member of short duration, such as is caused by operating the vehicle over an irregular roadway, is of insufficient duration to overcome the fluid resistance of the delay and damping mechanism, and consequently is damped and not operative to cause an adjustment to the air spring. However, if the relative movement between the vehicle members is sustained over a prolonged period of time, such as is caused by increasing the load carried by the vehicle body, the shaft 14 is rotated clockwise, whereby the center portion of each pair of leaf springs 58 moves off the opposed flats 59 and 60 of the shaft and are engaged by the curved surfaces 61 and 62. Consequently the center portion of each pair of springs is flexed transversely outwardly relative to the axis of the shaft 14, and is effective to increase the coupling between the latter and the pendant assembly. As said coupling is increased, the pressure exerted upon the button 82 connected to the upper diaphragm member 75 is also increased and is effective to cause the fluid medium in the chamber 78 to be metered through the orifice 73 and into the lower chamber 79 thereby creating a pressure differential between the latter and the upper chamber 78. And with the transgression of the fluid medium from the chamber 78 and into chamber 79, the flexible diaphragm member 75 moves toward the plate 70, whereas the flexible diaphragm member 76 is stretched and moves away from the opposite side of said plate. Consequently, the pendant assembly is rotated in a clockwise direction while the buttons 82 remain in substantial contact with the opposed side walls 19 and 20 of the body 6. After a predetermined period of time, a sufficient quantity of fluid medium is transferred from one chamber to the other such that the pendant assembly is rotated through an arc such as to cause the lug or finger 65 to depress the valve actuating pin 36 for the valve in the sleeve fitting 35 whereby the chamber 9 and the air spring in circuit therewith are connected to the source of pressurized air. Said air spring is thereby inflated and is effective to return the vehicle members to their normal "safe-riding" spaced relationship.

The relative movement between the vehicle members resulting from the adjustment to the air spring is effective to rotate the actuating shaft 14 in the opposite or counterclockwise direction, which thereby effects an oppositely directed resilient coupling between the latter and the pendant assembly. With the shaft now being rotated in the opposite direction, the force previously exerted on the diaphragm member 75 to move the latter toward the plate 70 is removed. And, as a result of removing said force, the differential in pressure between the upper and lower chambers 78 and 79 respectively, is effective to cause the fluid medium previously transferred to be rapidly returned to the upper chamber. The pendant assembly is then free to swing in a counterclockwise direction under the influence of the shaft and allows the valve actuating pin 36 to rise upwardly out of the sleeve fitting 35 under the influence of its spring, as is understood in the art, to close the valve in said fitting and disconnect the chamber 9 and air spring from the source of pressurized air. When the vehicle members are returned to their normal "safe-riding" spaced relationship, the components of the damped valve device have been returned to their nonoperative position as shown in Fig. 1 to await a subsequent actuation of the shaft 14.

It is now apparent that when the vehicle members move relatively away from each other, such as occurs when the load carried by the vehicle body is decreased, the damped valve device of the present invention is operative to deflate the air spring in proportion to said relative movement. Specifically, after overcoming the initial resistance of the delay and damping mechanism acting in an opposite manner to that previously described, the resilient coupling between the shaft 14 and the pendant assembly 41 is increased sufficiently to swing the latter counterclockwise as viewed in Fig. 1. The lug or finger 66 on the end of the pendant assembly 41 is effective to pull the actuating pin 37 upwardly within the chamber 9 and open the valve in the sleeve fitting 33 whereby said chamber and air spring in circuit therewith are connected to atmosphere. Said air spring is deflated thereby in proportion to the initial sustained relative movement between the vehicle members and the latter are returned to their normal "safe-riding" spaced relationship. The relative movement between the vehicle members resulting from the adjustment of said air spring effects in the same manner as above described the return of the components of the damped valve device to their nonoperative position to await a subsequent actuation of the shaft 14.

In Fig. 7 is shown a modified form of pendant assembly that is substantially more simple in construction than the previous form disclosed herein. More specifically, the instant form of pendant assembly comprises an elongated arm or leaf 176 formed of a suitable spring material and mounting on its end a delay and damping mechanism 177 substantially similar to the corresponding mechanism utilized in the form of Figs. 1-6 inclusive. However, in the instant form, the end extremity 178 of the leaf 176 is used as the center metering plate in the same manner as the flat plate 70 of said previous embodiment. A second similarly formed elongated arm or leaf 181 is placed over the leaf 176 in a complemental opposed relationship and one end thereof is secured to the latter adjacent the delay and damping mechanism 177 by means of a suitable fastener 182. In like manner, the opposite end of the leaf 181 is secured to the adjoining abutting end of the leaf 176. The shaft 14 is interposed between the leaf members such that the center portion of the leaf 181 embraces and seats upon the flat 59 of said shaft while the opposed center portion of the leaf 176 is similarly disposed on the flat 60 on the diametrically opposite face of said shaft. The end of the leaf 176, opposite to the delay and damping mechanism 177, may also be provided with a flange portion 185 extending longitudinally outwardly thereof and which is operative to actuate the valve pins for the valves controlling the inflation and/or deflation of the air spring in a manner similar to that of the fingers 65 and 66 of said previous form.

With the above described structure, it is now realized that the instant form of pendant assembly is operative in conjunction with the actuating shaft 14 of the damped valve device, in a manner similar to that of the pendant assembly utilized in the aforesaid previous forms disclosed herein, to effect an adjustment to the air spring in response to a relative movement between the vehicle members of prolonged duration.

Although not shown, it is also contemplated that the leaf members 176 and 181 may be constructed as a single spring unit, for example, formed of a suitable plastic material such as nylon or the like by an extrusion process, and having resilient properties equivalent to the structure described above.

Having thus described in detail several preferred embodiments, it is realized that the present invention is susceptible of various modifications and combinations without departing from the scope of the claims.

Having thus described my invention, I claim:

1. A damped valve device for controlling a fluid pressure unit that effects the relative movement between two movable members, comprising a housing formed with a pressure chamber, a shaft oscillatably journalled in said housing and extending transversely through said pressure chamber, pendant means mounted intermediate its ends on said shaft and including a pair of substantially identical stamped members in complemental opposed relation defining a spring cavity and separate enclosure means, a torque coupling between said shaft and pendant means comprising a pair of leaf springs disposed in said spring cavity embracing diametrically opposed flats formed centrally on said shaft and operatively connected at the ends thereof to said stamped members, means for connecting said pressure chamber to said fluid pressure unit, first valve means for connecting said pressure chamber to a source of pressure fluid, second valve means for connecting said pressure chamber to atmosphere, means carried on one end of said pendant means and movable therewith in one direction of oscillation of the shaft to actuate said first valve means and movable upon said shaft being oscillated in the opposite direction to actuate said second valve means, and damping means effective to delay the movement of the pendant means comprising an impervious element disposed in said separate enclosure means and attached to said pendant means, a flexible diaphragm member mounted at its peripheral portion to each opposed side of said impervious element defining a pair of separate pressure fluid chambers containing a fluid medium, said impervious element including an orifice interconnecting said pressure fluid chambers in fluid circuit, and actuating means attached to each of said flexible diaphragm members extending outwardly of said enclosure means in opposite directions and engaging the housing, said actuating means being operative to cause a transgression of the fluid medium between said pressure fluid chambers in response to a sustained oscillation of said shaft in either direction to effect the swinging of the pendant means.

2. A damped valve device for controlling a fluid pressure unit that effects the relative movement between two movable members as defined in claim 1 and wherein the valve means comprise normally closed valve members which are selectively opened in response to sustained oscillations of the shaft effective to swing the pendant means in opposite directions.

References Cited in the file of this patent

UNITED STATES PATENTS

| | | |
|---|---|---|
| 1,704,503 | Gamble | Mar. 5, 1929 |
| 1,895,477 | McCune | Jan. 31, 1933 |
| 1,962,993 | Leece | June 12, 1934 |
| 2,088,184 | White | July 27, 1937 |
| 2,361,575 | Thompson | Oct. 31, 1944 |
| 2,490,311 | Du Rostu | Dec. 6, 1949 |
| 2,593,906 | Markson | Apr. 22, 1952 |
| 2,670,201 | Rossman | Feb. 23, 1954 |
| 2,888,273 | Jackson | May 26, 1959 |